United States Patent Office 2,810,450
Patented Oct. 22, 1957

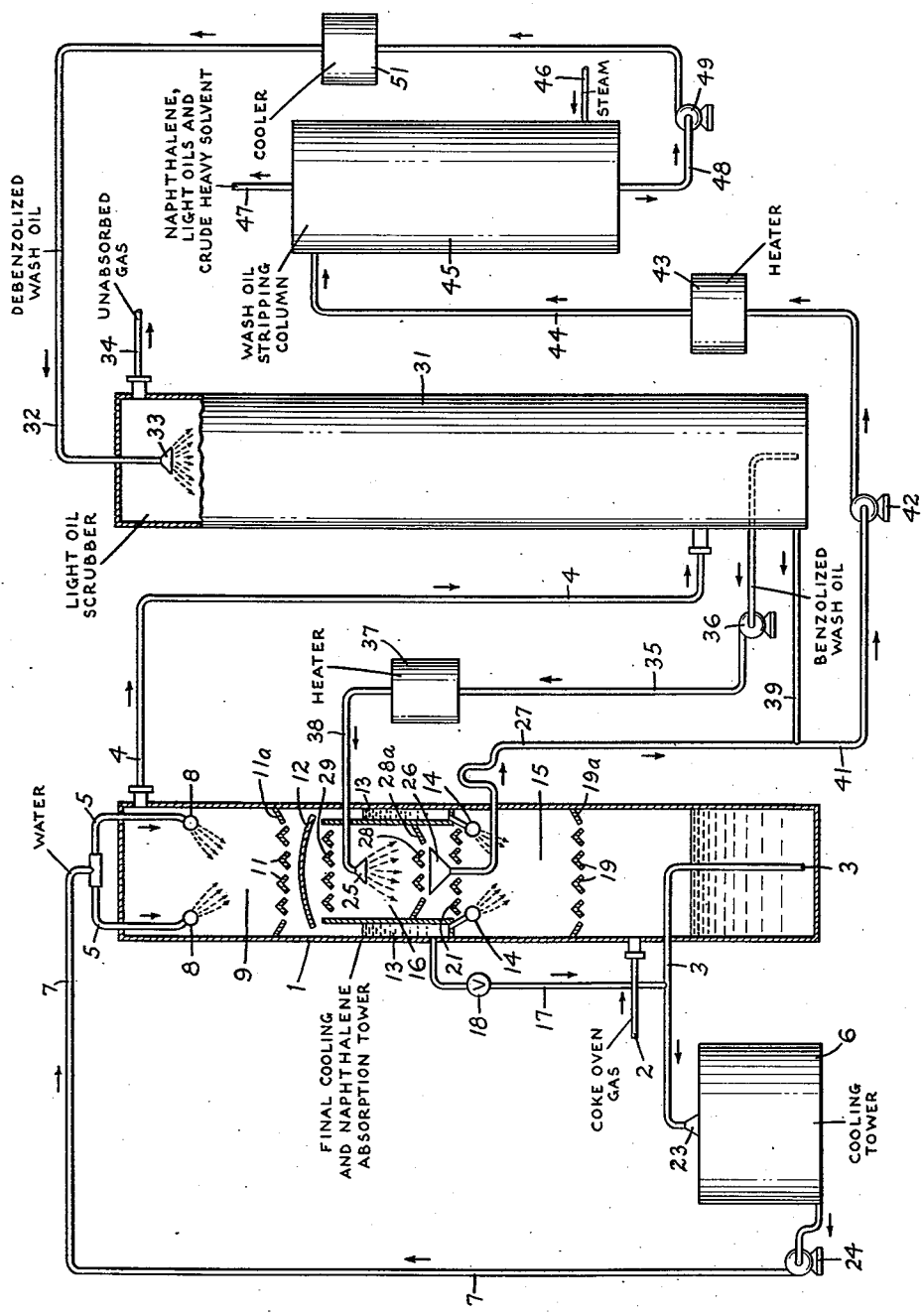

2,810,450

METHOD AND APPARATUS FOR TREATING COKE OVEN GAS

Leonhard T. Hartmann, New York, N. Y., assignor to Allied Chemical & Dye Corporation, New York, N. Y., a corporation of New York Application June 8, 1956, Serial No. 590,293

7 Claims. (Cl. 183—2)

This invention relates to method and apparatus for treating coke oven gas and, more particularly, for final cooling of coke oven gas and recovery of naphthalene therefrom.

In the recovery of by-products such as naphthalene from coke oven gas, the gas is passed through a primary cooler where it exits saturated with naphthalene at about 98 to 103° F. The gas is then passed through an extractor for the separation of tars. The gas is next passed through a sulfuric acid saturator for the removal of ammonia. The gas leaving the saturator is carried to a final cooler in order to reduce the gas temperature sufficiently for efficient removal of light oil constituents (i. e. benzol and its homologues) from the coke oven gas. In the final cooler, the coke oven gas is usually cooled to a temperature of about 75° to 85° F., at which temperature the naphthalene precipitates as crystals. The naphthalene slurry leaving the final cooler is collected in pans. Most of the naphthalene rises to the surface of water where it is skimmed off and recovered. The residual water is generally recooled and recirculated to the coolers. When this procedure is employed, relatively high labor and equipment costs are required to produce a marketable naphthalene product. Further, the cooling water recirculated to the coolers, as well as the gas leaving the final cooler, still contain appreciable amounts of naphthalene which frequently clog up other parts of the apparatus.

An object of the present invention is to provide an efficient and economical process for final cooling of coke oven gas and recovery of naphthalene therefrom.

Another object of the present invention is to provide apparatus of simple and economical construction for final cooling of coke oven gas and recovery of naphthalene therefrom.

Other objects and advantages will be apparent from the following description and accompanying drawing.

In accordance with the present invention, a process for final cooling of and recovery of naphthalene from coke oven gas which has been subjected to primary cooling and then denuded of tar and ammonia and contains naphthalene and light oil constituents is carried out by effecting partial final cooling of the coke oven gas to temperature above the precipitation temperature of the naphthalene in the gas by contact with cooling water previously used in completing final cooling of the gas, absorbing naphthalene from the partially cooled gas by contact with light oil-enriched (benzolized) wash oil, completing final cooling of the gas to temperature at which light oil constituents of the gas may be efficiently removed by contact with cooling water, utilizing the last-named cooling water to effect the aforesaid partial final cooling, scrubbing light oil constituents from the completely cooled gas by contact with lean wash oil, utilizing light oil-enriched wash oil so produced (after heating, if necessary) to absorb naphthalene from the partially finally cooled gas, and recovering naphthalene and light oil constituents from the wash oil enriched therewith.

In preferred practice of the invention, the water utilized in the partial final cooling of the coke oven gas is collected, cooled to suitably low temperature and then returned into contact with the partially finally cooled gas from which naphthalene has been absorbed. Also, preferred practice involves stripping of naphthalene and light oil constituents from the wash oil enriched therewith and utilizing the resulting lean oil to absorb light oil content from the completely finally cooled gas. In the interest of economy and efficiency of control of the naphthalene absorption step, it is preferred, further, that a portion only, ordinarily about 30 to 50%, of the light oil-enriched wash oil be utilized as absorbing medium for naphthalene, the remainder of this light oil-enriched oil being combined with the naphthalene-enriched wash oil for recovery of naphthalene and light oil constituents therefrom. The benzolized wash oil supplied to the naphthalene absorption step is preferably at substantially, or better, somewhat above the temperature of the gas entering the absorption step to avoid substantial temperature change within that step and condensation into the wash oil of cooling water contained in the gas.

One type of apparatus that may be used in practice of the present invention includes a gas and liquid countercurrent contact tower comprising a gas inlet and cooling water outlet near the bottom of the tower, a gas outlet and cooling water inlet near the top of the tower and a series of interconnected, and preferably, vertically contiguous, contact chambers. A lower cooling chamber provided with spray means for introduction of cooling water permits partial final cooling of the coke oven gas to temperature above the precipitation temperature of the naphthalene in the gas so that no precipitation of naphthalene takes place. An intermediate naphthalene absorption chamber provided with spray means for introduction of benzolized wash oil permits absorption of naphthalene from the coke oven gas. Finally, an upper cooling chamber provided with spray means for introduction of cooling water enables completion of the final cooling of the coke oven gas to a temperature at which its light oil constituents may be efficiently removed from the coke oven gas by absorption with wash oil. Further, means, including connections and pumps where required, are provided (1) for conducting cooling water used in the upper cooling chamber to the spray means of the lower cooling chamber, and (2) for collecting and discharging the naphthalene-enriched wash oil from the intermediate chamber.

In a specific embodiment of the present invention, the apparatus includes (I) a gas and liquid countercurrent contact tower comprising a vertical cylindrical casing having a gas inlet and cooling water outlet near the bottom of the casing, a gas outlet and cooling water inlet near the top of the casing and a series of interconnected, vertically contiguous, contact chambers disposed between the sets of inlets and outlets, (a) a lower cooling chamber for effecting partial final cooling of the coke oven gas, multiple spray means at the top of said chamber for introducing cooling water thereto, (b) an upper cooling chamber for completing final cooling of the coke oven gas, multiple spray means at the top of said chamber for introducing cooling water thereto, means for delivering at least part of the cooling water from the bottom of said chamber around an intermediate absorption chamber and out of contact with its contents to the multiple spray means of the lower cooling chamber and to provide a gravity head for discharge of spray therethrough, and (c) the intermediate absorption chamber for absorbing naphthalene from the coke oven gas, spray means at the top of said chamber for introducing benzolized wash oil from supply means thereto, means for separating the naphthalene-containing wash oil from the coke oven gas and for removing said naphthalene-containing wash oil from the bottom of the intermediate chamber and from the tower; (II) a cooler, means for delivering cooling water from the bottom of the lower cooling chamber to the cooler for recooling of said water, means for delivering said recooled water from said cooler to the multiple spray means of the upper cooling chamber; and (III) a light oil scrubber for scrubbing light oil constituents from the coke oven gas, means for delivering coke oven gas from the top of the upper cooling chamber to the bottom of the light oil scrubber, means for introducing lean wash oil into the top of said light oil scrubber, means for receiving and delivering part of the benzolized wash oil from the bottom of said light oil scrubber to the spray means of the intermediate absorption chamber, and means for combining the remainder of said benzolized wash oil with the naphthalene-containing, benzolized wash oil removed from the intermediate absorption chamber for subsequent treatment.

The accompanying drawing is a schematic layout of the apparatus of one embodiment of my invention in which the countercurrent contact tower is shown in vertical sectional view.

In the drawing, a countercurrent contact tower is shown which comprises a vertical cylindrical shell or casing 1 having a gas inlet line 2 and a water outlet line 3 in the bottom part of the casing and a gas outlet line 4 and dual water inlet lines 5 in the top part of the casing. The contact tower is provided with three interconnected, vertically contiguous, contact chambers disposed between the sets of inlets and outlets. Coke oven gas, which has been cooled in a primary cooler, for example, to about 98° to 103° F., and has then been denuded of tar and ammonia, is introduced at a temperature of about 130° to 140° F. through line 2. This gas passes upwardly through each contact chamber and finally passes out of the tower through line 4. Cooling water at a temperature of about 55° to 80° F. is pumped from an atmospheric cooling tower 6 via lines 7 and 5 to multiple spray means 8 comprising preferably at least 5 pressure spray nozzles disposed around the periphery of upper cooling chamber 9. If desired, the central portion of chamber 9 may be provided with suitable baffle arrangement in order to attain more efficient contact of water and gas. The cooling water completes final cooling of the coke oven gas to a relatively low temperature at which light oil constituents of the gas may be efficiently removed, preferably about 60° to 85° F. Chamber 9 is provided near its bottom with gas distributing members 11 and annular inclined baffle 11a for efficient distribution of spray and coke oven gas. The water is then deflected to the peripheral portions of the contact tower by means of a baffle 12 and is gathered in a reservoir 13 disposed below baffle 12 and outside intermediate contact chamber 16, the reservoir having sufficient height to provide a gravity head for multiple spray means 14 discharging into lower cooling chamber 15 of the tower. Spray means 14 comprise preferably at least 5 low-head, gravity type nozzles disposed around the periphery of chamber 15. Reservoir 13 is preferably an annular chamber defined by the wall of the casing and the outer surface of intermediate naphthalene absorption chamber 16. Alternatively, a conduit or other reservoir may be positioned outside of the casing for delivering the cooling water from the bottom of chamber 9 to multiple spray means 14. Reservoir 13 is provided with a line 17 bearing valve 18 for bleedoff of water circulation. By means of the bleedoff, part of the cooling water may be bypassed to cooling tower 6 via line 3 to facilitate control of coke oven gas temperature in chamber 15.

The cooling water which is preheated to a slight degree in cooling chamber 9 is discharged into lower cooling chamber 15 by multiple spray means 14. If desired, the central portion of chamber 15 may be provided with suitable baffle arrangement. The water partially cools the incoming coke oven gas before it enters intermediate naphthalene absorption chamber 16 to a temperature above the precipitation temperature of the naphthalene in the gas, preferably about 98° to 103° F., in order to prevent precipitation of naphthalene in the water. The precipitation temperature of naphthalene in the gas is determined by the temperature to which the gas was cooled in the primary cooler in which the gas becomes saturated with naphthalene. Chamber 15 is provided near its bottom with gas distributing members 19 and annular inclined baffle 19a for efficient distribution of spray and coke oven gas. Further, near the top of chamber 15 is positioned an entrainment arrestor 21 to prevent carryover of water to absorption chamber 16. Above entrainment arrestor 21 is disposed means for admitting gas into intermediate chamber 16 and collecting out of contact therewith naphthalene-laden oil exiting that chamber. As shown, these admission and collecting means may comprise a chalice 26 disposed below gas distributing members 28 and annular inclined baffle 28a, each provided with drip edges, the baffle surrounding an area smaller than the area of the chalice interior so that all drip edges of distributing members and baffle are thereabove.

Cooling water is withdrawn from the bottom of cooling chamber 15 through line 3 and is delivered to spray means 23 which sprays the water into atmospheric cooling tower 6. In this tower the water is cooled as far as practicable, preferably to about 55° to 80° F., and is then pumped by means of pump 24 via lines 7 and 5 to spray means 8 of cooling chamber 9.

In absorption chamber 16 the partially final cooled coke oven gas, preferably at a temperature of about 98° to 103° F., is contacted with a stream of benzolized wash oil introduced through spray means 25. The benzolized wash oil absorbs naphthalene present in the coke oven gas. The naphthalene-containing, benzolized wash oil is gathered in chalice 26 and is then removed from the tower via line 27. Chamber 16 is provided near its top with an entrainment arrestor 29 to prevent carryover of wash oil into the water stream. Instead of a single naphthalene absorption chamber, a number of absorption chambers may be used, if desired or required, to effect complete removal of naphthalene and permit cooling of the gas in chamber 9 to lower temperatures without fear of naphthalene precipitation.

The finally cooled gas leaving chamber 9 of the contact tower is passed via line 4 to the bottom of a light oil scrubber 31. Debenzolized (light oil-free) wash oil is passed via line 32 through spray means 33 into the light oil scrubber and passes countercurrent to the coke oven gas, thereby absorbing its light oil content as well as any residual naphthalene. Unabsorbed gas is passed out of the top of the light oil scrubber via line 34 for disposal. Instead of a single light oil scrubber, a number of scrubbers connected in series may be used in order to increase the efficiency of the light oil scrubbing operation. Each of these light oil scrubbers may be provided with conventional sprays and baffle arrangements throughout their lengths in order to attain more efficient contact of the wash oil and coke oven gas.

Part, say about 30 to 50%, of the light oil-enriched (benzolized) wash oil is removed from the light oil scrubber via line 35 and is pumped by means of pump 36 to a heater 37 for slight heating, for example, to about 98° to 103° F., the temperature being controlled in such a way that the wash oil enters absorption chamber 16 at a temperature no lower than the gas temperature in order to avoid condensation of water from the gas into the wash oil stream. The heated oil is then delivered via line 38 to spray means 25 for use in chamber 16 for the absorption of naphthalene from the coke oven gas. The remainder of the benzolized wash oil exits scrubber 31 via line 39 and combines in line 41 with the naphthalene-containing, benzolized wash oil delivered from absorption chamber 16. The combined wash oil materials are then pumped by means of pump 42 to a heater 43 where they are preheated, preferably to a temperature of about 110° to 115° C. The preheated wash oil materials are then passed through line 44 to the top of a wash oil stripping column 45 where, by countercurrent stripping with direct steam introduced into column 45 via line 46, the light oil, crude heavy solvent and naphthalene content of the oil passes with the vapors from the top of the column through line 47.

The vapors leaving column 45 may then be sent to installation (not shown) for separation of light oil constituents, crude heavy solvent and naphthalene. For example, the vapors may be freed of wash oil content by condensation and then subjected to a series of distillation steps to yield as products, light oil constituents, crude heavy solvent and substantially pure naphthalene (M. P. 74–77° C.).

Debenzolized wash oil is removed from the bottom of column 45 through line 48 and is then pumped by means of pump 49 to cooler 51 where the oil is cooled, preferably to a temperature no lower than the gas leaving the cooling chamber 9. The cooled, debenzolized wash oil is then introduced into spray means 33 of light oil scrubber 31 via line 32.

In operation, cooling water at a temperature of about 55° to 80° F. from cooling tower 6 is introduced into upper cooling chamber 9 of the countercurrent contact tower countercurrent to upwardly rising coke oven gas. This water cools the gas, which enters cooling chamber 9 at a temperature of about 98° to 103° F., to a temperature of about 60° to 85° F. The water is gathered in reservoir 13 having sufficient height to provide a gravity head for sprays 14 discharging into lower cooling chamber 15. The water from reservoir 13, which has been preheated in cooling chamber 9 to a temperature of about 60° to 85° F., discharges into cooling chamber 15 through sprays 14 to effect initial cooling of the coke oven gas, which enters the tower at a temperature of about 130° to 140° F.

Used cooling water is withdrawn from the bottom of cooling chamber 15 and is passed to atmospheric cooling tower 6 where the water is cooled to the desired temperature of about 55° to 80° F. and is then recirculated to spray means 8 of upper cooling chamber 9.

The gas leaves cooling chamber 15 at a temperature of about 98° to 103° F. and is passed upwardly through intermediate absorption chamber 16 where the gas is contacted with a stream of benzolized wash oil at a temperature about equal to that of the gas, the wash oil absorbing naphthalene. The naphthalene-containing, benzolized wash oil is gathered in chalice 26 and is then removed from the tower.

The coke oven gas leaving cooling chamber 9 is passed through light oil scrubber 31 countercurrent to lean wash oil, whereby the light oil content and the residual naphthalene present in the coke oven gas are absorbed.

About 30 to 50% of the benzolized wash oil from light oil scrubber 31 is employed as absorbent for naphthalene in absorption chamber 16. The remainder of the benzolized wash oil is combined with the naphthalene-containing, benzolized wash oil removed from absorption chamber 16 and is then subjected to treatment for separation of light oil constituents, crude heavy solvent and naphthalene.

In the separation of the aforementioned components, the combined wash oil materials are preheated to a temperature of about 110° to 115° C. and are then countercurrently stripped with direct steam in stripping column 45 to remove as overhead, light oil constituents, crude heavy solvent and naphthalene. Debenzolized wash oil is passed from the base of the stripper and is delivered to light oil scrubber 31 to be used as absorption medium. The wash oil content of the overhead gases is then removed by condensation, and the residual material is finally subjected to a series of distillation steps, whereby light oil constituents, crude heavy solvent and substantially pure naphthalene are separately recovered as products.

The present process and apparatus for final cooling of coke oven gas and recovery of naphthalene possess many advantages. First, the two-step final cooling arrangement with the naphthalene absorption interspersed permits partial cooling of the gas to above the precipitation temperature of the naphthalene in the gas so that no precipitation occurs which might otherwise plug up various parts of the apparatus, as well as represent loss of naphthalene. At the same time, the partial cooling step cools the coke oven gas to and the naphthalene absorption step is effected at a temperature low enough so that light oil is not forced into the coke oven gas which would then create a greater load on the light oil scrubber and subsequent loss of light oil. Further, by removal of naphthalene prior to completing final cooling of the coke oven gas, the final cooling may be carried out to relatively low temperature without fear of precipitation of naphthalene. This is particularly advantageous since the lower the temperature of the coke oven gas the more efficient removal of light oil is obtained in the light oil scrubbing procedure. In addition, the present procedure enables substantially complete recovery of naphthalene which may then be conveniently treated to recover this product in substantially pure form. Further, the water used as the cooling medium in the present procedure at all times contains so little naphthalene that it may readily be recooled and recirculated for additional final cooling of coke oven gas without causing naphthalene loss or plugging of equipment.

Although certain preferred embodiments of the present invention have been discussed for purposes of illustration, it is evident that various changes and modifications may be made therein without departing from the spirit and scope of the invention.

I claim:

1. A gas and liquid countercurrent contact tower adapted for use in final cooling of coke oven gas and recovery of naphthalene therefrom comprising a gas inlet and cooling water outlet near the bottom of the tower, a gas outlet and cooling water inlet near the top of the tower and a series of interconnected contact chambers disposed between the sets of inlets and outlets, (a) a lower cooling chamber for effecting partial final cooling of the coke oven gas, spray means at the top of said lower chamber for introducing cooling water thereto, (b) an upper cooling chamber for completing final cooling of the coke oven gas, spray means at the top of said upper chamber for introducing cooling water thereto, means for delivering cooling water from the bottom of said upper chamber, out of direct contact with the coke oven gas, to the spray means of the lower cooling chamber and to provide a gravity head for discharge of spray therethrough, and (c) an intermediate absorption chamber for absorbing naphthalene from the coke oven gas, spray means at the top of said intermediate chamber for introducing benzolized wash oil thereto, and means for collecting and discharging the naphthalene-enriched wash oil from said intermediate chamber.

2. Apparatus adapted for final cooling of coke oven gas and recovery of naphthalene therefrom comprising (I) a gas and liquid countercurrent contact tower comprising a gas inlet and cooling water outlet near the bottom of the tower, a gas outlet and cooling water inlet near the top of the tower and a series of interconnected, vertically contiguous, contact chambers disposed between the sets of inlets and outlets, (a) a lower cooling chamber for effecting partial final cooling of the coke oven gas, multiple spray means at the top of said chamber for introducing cooling water thereto, (b) an upper cooling chamber for completing final cooling of the coke oven gas, multiple spray means at the top of said chamber for introducing cooling water thereto, means for delivering cooling water from the bottom of said chamber, around an intermediate absorption chamber and out of contact with its contents, to the multiple spray means of the lower cooling chamber and to provide a gravity head for discharge of spray therethrough, and (c) the intermediate absorption chamber for absorbing naphthalene from the coke oven gas, spray means at the top of said chamber for introducing benzolized wash oil from supply means thereto, means for separating the naphthalene-containing wash oil from the coke oven gas and for removing said naphthalene-containing, benzolized wash oil from the bottom of said intermediate chamber and from the tower; and (II) a cooler, means for delivering cooling water from the bottom of the lower cooling chamber to the cooler for recooling of said water, and means for delivering said recooled water from said cooler to the multiple spray means of the upper cooling chamber.

3. Apparatus adapted for final cooling of coke oven gas and recovery of naphthalene therefrom comprising (I) a gas and liquid countercurrent contact tower comprising an upright casing, a gas inlet and cooling water outlet near the bottom of the casing, a gas outlet and cooling water inlet near the top of the casing and a series of interconnected, vertically contiguous, chambers disposed between the sets of inlets and outlets, (a) a lower cooling chamber for effecting partial final cooling of the coke oven gas, multiple spray means at the top of said lower chamber for introducing cooling water thereto, (b) an upper cooling chamber for completing final cooling of the coke oven gas, multiple spray means at the top of said upper chamber for introducing cooling water thereto, means for delivering at least part of the cooling water from the bottom of said upper chamber around an intermediate absorption chamber and out of contact with its contents, to the spray means of the lower cooling chamber and to provide a gravity head for discharge of spray therethrough, and (c) the intermediate absorption chamber for absorbing naphthalene from the coke oven gas, spray means at the top of said intermediate chamber for introducing benzolized wash oil thereto, means for separating the naphthalene-containing wash oil from the coke oven gas and for removing said naphthalene-containing, benzolized wash oil from the botttom of said intermediate chamber and from the tower; (II) a cooler, means for delivering cooling water from the bottom of the lower cooling chamber to the cooler for recooling of said water, means for delivering said recooled water from said cooler to the multiple spray means of the upper cooling chamber; and (III) a light oil scrubber for scrubbing light oil constituents from the coke oven gas, means for introducing lean wash oil into the top of said light oil scrubber, means for receiving and delivering part of the benzolized wash oil from the bottom of said light oil scrubber to the spray means of the intermediate absorption chamber, and means for combining the remainder of said benzolized wash oil with the naphthalene-containing wash oil removed from the intermediate absorption chamber for subsequent treatment.

4. A process for final cooling of and recovery of naphthalene from coke oven gas which has been subjected to primary cooling and denuded of tar and ammonia and contains naphthalene and light oil constituents which comprises effecting partial final cooling of the coke oven gas to temperature above the precipitation temperature of the naphthalene in the gas by contact with cooling water previously used in completing final cooling of the gas, absorbing naphthalene from the partially cooled gas by contact with benzolized wash oil, completing final cooling of the gas by contact with cooling water to temperature at which light oil constituents of the gas may be efficiently removed by scrubbing with lean wash oil, utilizing the last-named cooling water to effect the aforesaid partial final cooling, scrubbing light oil constituents from the completely cooled gas with lean wash oil, utilizing the light oil-enriched wash oil so produced to absorb naphthalene from the partially finally cooled gas, and recovering light oil constituents and naphthalene from the wash oil enriched therewith.

5. A process for final cooling of and recovery of naphthalene from coke oven gas which has been subjected to primary cooling and denuded of tar and ammonia and contains naphthalene and light oil constituents which comprises effecting partial final cooling of the coke oven gas to temperature above the precipitation temperature of the naphthalene in the gas by contact with cooling water previously used in completing final cooling of the gas, absorbing naphthalene from the partially cooled gas by contact with benzolized wash oil, completing final cooling of the gas by contact with cooling water to temperature at which light oil constituents of the gas may be efficiently removed by scrubbing with lean wash oil, utilizing the last-named cooling water to effect the aforesaid partial final cooling, collecting the water used in effecting partial final cooling of the coke oven gas, recooling the collected water, recirculating said recooled water for use in completing the final cooling of the coke oven gas, scrubbing light oil constituents from the completely cooled gas with lean wash oil, utilizing the light oil-enriched wash oil so produced for absorbing naphthalene from the partially finally cooled gas, and recovering light oil constituents and naphthalene from the wash oil enriched therewith.

6. A process for final cooling of and recovery of naphthalene from coke oven gas which has been subjected to primary cooling and denuded of tar and ammonia and contains naphthalene and light oil constituents which comprises effecting partial final cooling of the coke oven gas to temperature above the precipitation temperature of the naphthalene in the gas by contact with cooling water previously used in completing final cooling of the gas, absorbing naphthalene from the partially cooled gas by contact with benzolized wash oil, completing final cooling of the gas by contact with cooling water to temperature at which light oil constituents of the gas may be efficiently removed by scrubbing with lean wash oil, utilizing the last-named cooling water to effect the aforesaid partial final cooling, collecting the cooling water used in the partial final cooling, recooling the collected water, recirculating said recooled water for use in completing the final cooling of the coke oven gas, scrubbing light oil constituents from the completely cooled gas with lean wash oil, employing part of the light oil-enriched wash oil for absorbing naphthalene from the partially finally cooled gas, combining the remainder of the light oil-enriched wash oil with the naphthalene-containing wash oil, and recovering light oil constituents and naphthalene from said combined oils.

7. A process for final cooling of and recovery of naphthalene from coke oven gas which has been subjected to primary cooling and denuded of tar and ammonia and contains naphthalene and light oil constituents which comprises effecting partial final cooling of the coke oven gas to temperature above the precipitation temperature of the naphthalene in the gas by contact with cooling water previously used in completing final cooling of the gas, absorbing naphthalene from the partially cooled gas by contact with benzolized wash oil, completing final cooling of the gas by contact with cooling water to temperature at which light oil constituents of the gas may be efficiently removed by scrubbing with lean wash oil, utilizing the last-named cooling water to effect the aforesaid partial final cooling, collecting the cooling water used in the partial final cooling, recooling the collected water, recirculating said recooled water for use in completing the final cooling of the coke oven gas, scrubbing light oil constituents from the completely cooled gas with lean wash oil, employing about 30 to 50% of the light oil-enriched wash oil for absorbing naphthalene from the finally cooled gas, combining the remainder of the light oil-enriched wash oil with the naphthalene-containing wash oil, stripping light oil constituents and naphthalene from said combined oils, and employing the residual oil as lean oil in the light oil scrubbing step.

References Cited in the file of this patent

UNITED STATES PATENTS 2,715,948    Lewis et al. _____ Aug. 23, 1955